United States Patent
Salomon-Bahls

(10) Patent No.: US 6,612,623 B2
(45) Date of Patent: Sep. 2, 2003

(54) CONNECTING DEVICE FOR PIPES CONDUCTION PRESSURE MEDIUM

(75) Inventor: Bernd Salomon-Bahls, Halver (DE)

(73) Assignee: Armaturenfabrik Hermann Voss GmbH & Co. KG, Wipperfurth (DE)

(*) Notice: Subject to any disclaimer, the term of this patent is extended or adjusted under 35 U.S.C. 154(b) by 0 days.

(21) Appl. No.: 09/982,517

(22) Filed: Oct. 18, 2001

(65) Prior Publication Data

US 2002/0140226 A1 Oct. 3, 2002

(51) Int. Cl.⁷ .............................. F16L 55/16
(52) U.S. Cl. .......................... 285/308; 285/340
(58) Field of Search ................. 285/340, 322, 285/308, 315

(56) References Cited

U.S. PATENT DOCUMENTS

| | | | |
|---|---|---|---|
| 4,123,090 A | * 10/1978 | Kotsakis et al. | 285/340 X |
| 4,288,113 A | * 9/1981 | Saulnier | 285/308 X |
| 4,593,943 A | * 6/1986 | Hama et al. | 285/308 |
| 4,630,848 A | * 12/1986 | Twist et al. | 285/308 |
| 4,747,626 A | * 5/1988 | Hama et al. | 285/308 |
| 5,160,179 A | * 11/1992 | Takagi | 285/340 |
| 5,292,157 A | * 3/1994 | Rubichon | 285/308 X |
| 5,487,572 A | * 1/1996 | Combot-courrau et al. | 285/308 |
| 5,692,784 A | * 12/1997 | Hama et al. | 285/308 |
| 5,911,443 A | * 6/1999 | LeQuere | 285/340 |
| 6,343,814 B1 | * 2/2002 | Bucher et al. | 285/319 |

FOREIGN PATENT DOCUMENTS

| | | | | |
|---|---|---|---|---|
| DE | 4304241 | * | 8/1994 | 285/308 X |
| EP | 272988 | * | 6/1987 | 285/308 X |
| GB | 625022 | | 6/1949 | |
| JP | 5248581 | * | 9/1993 | 285/308 X |
| JP | 6300175 | * | 10/1994 | 285/340 |

* cited by examiner

*Primary Examiner*—Lynne H. Browne
*Assistant Examiner*—David E. Bochna
(74) *Attorney, Agent, or Firm*—Kilpatrick Stockton LLP

(57) ABSTRACT

A connecting device for pipes conducting pressure medium, having a sleeve-like insert part which can be inserted in a frictional or form-fitting manner into a connecting opening in a connecting body and surrounding a receiving opening for a pipe to be inserted, a sealing element for producing a seal between the connecting body and the pipe, and a holding element with holding arms which extend radially inwardly into the receiving opening. A release sleeve engages displaceably in the insert part in such a manner that by pushing in the release sleeve, the holding element is deformed elastically for releasing the pipe. The holding element is held by an outer circumferential region in an essentially clearance-free manner axially relative to the insert part, so that elastic deformation takes place in the region of the holding arms when inserting or releasing the pipe.

14 Claims, 7 Drawing Sheets

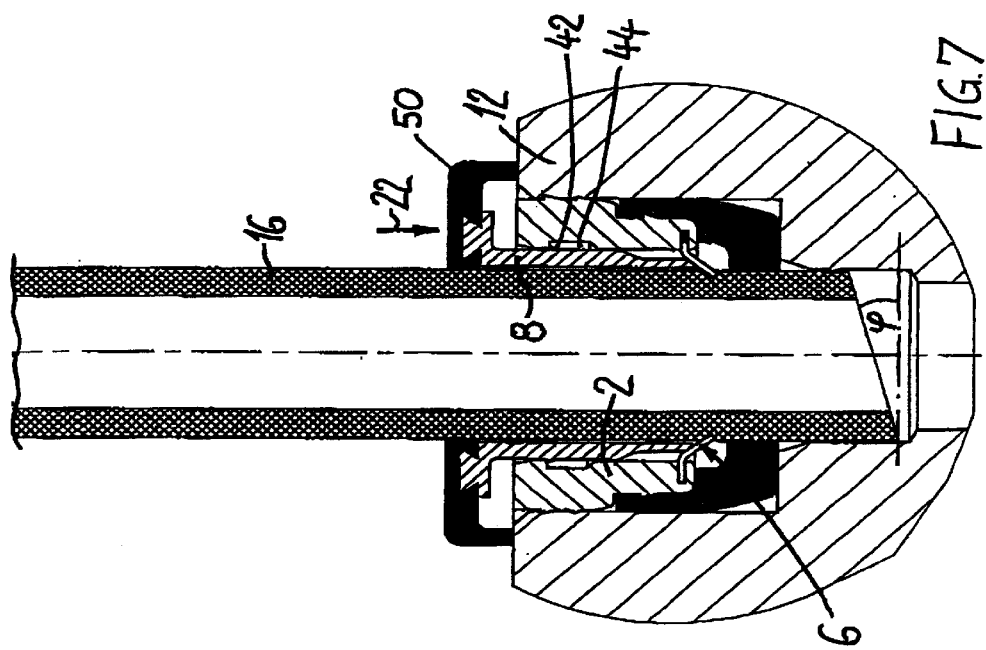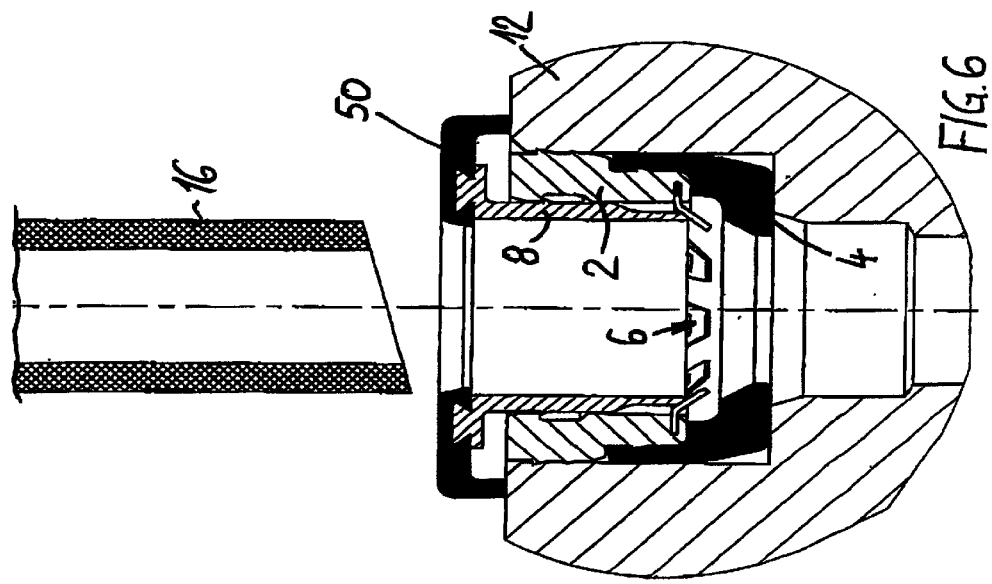

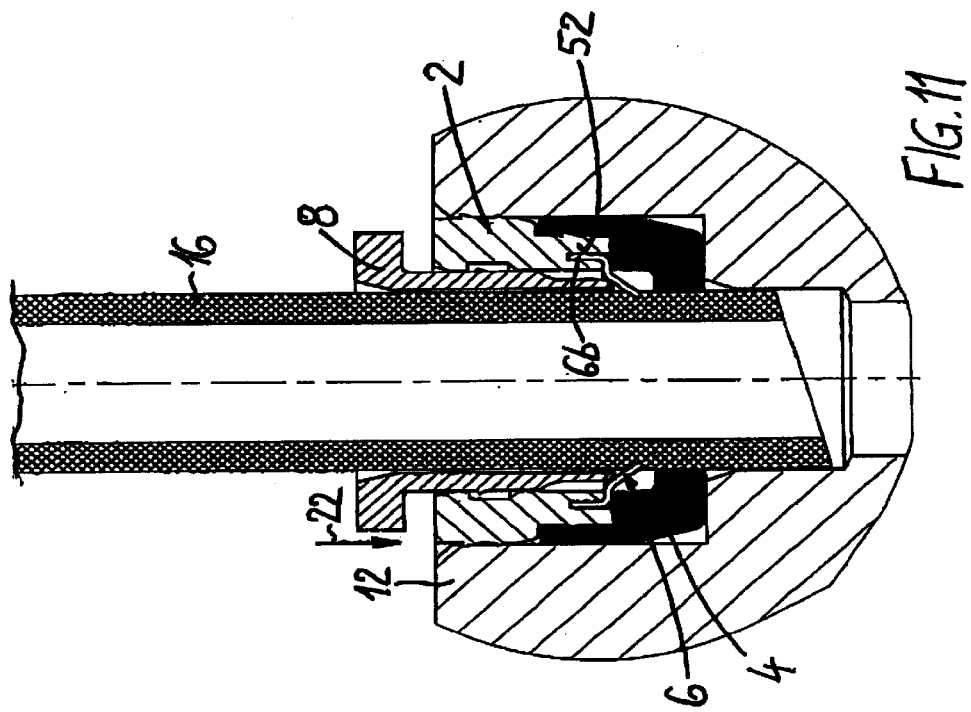
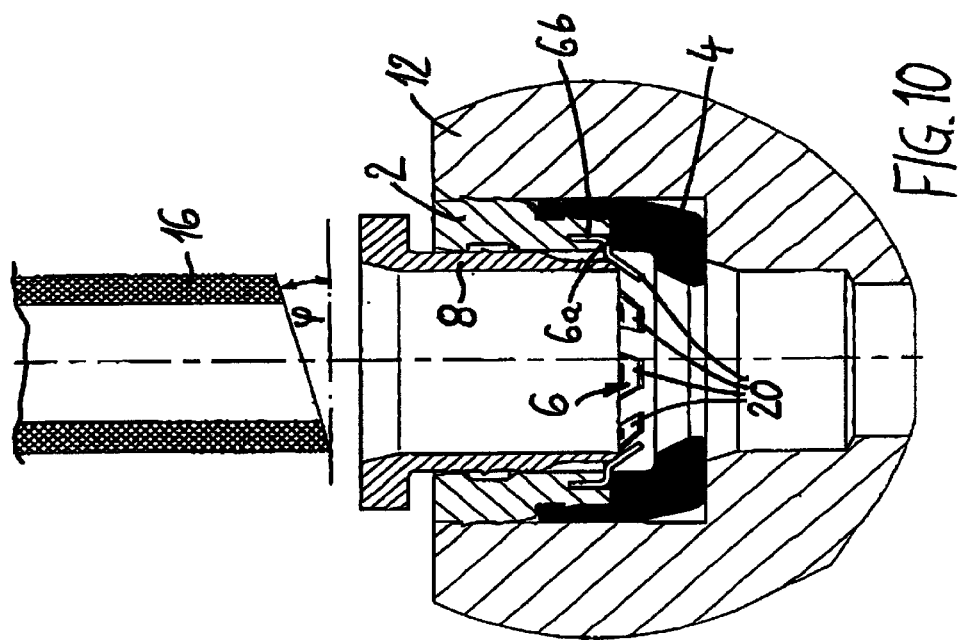

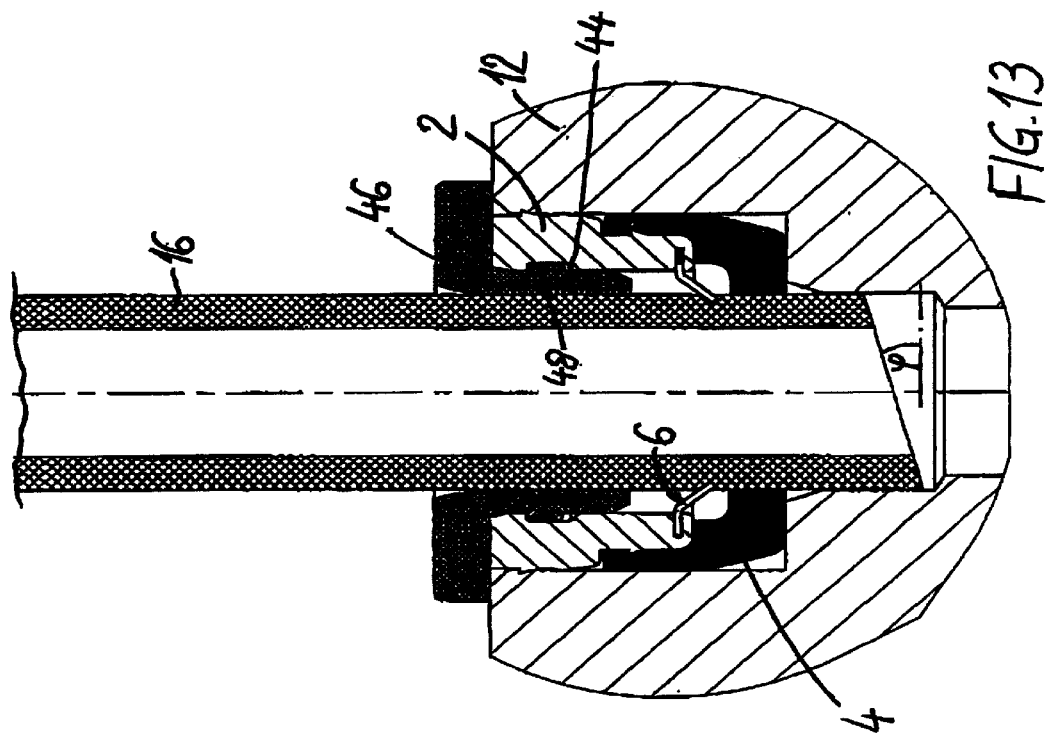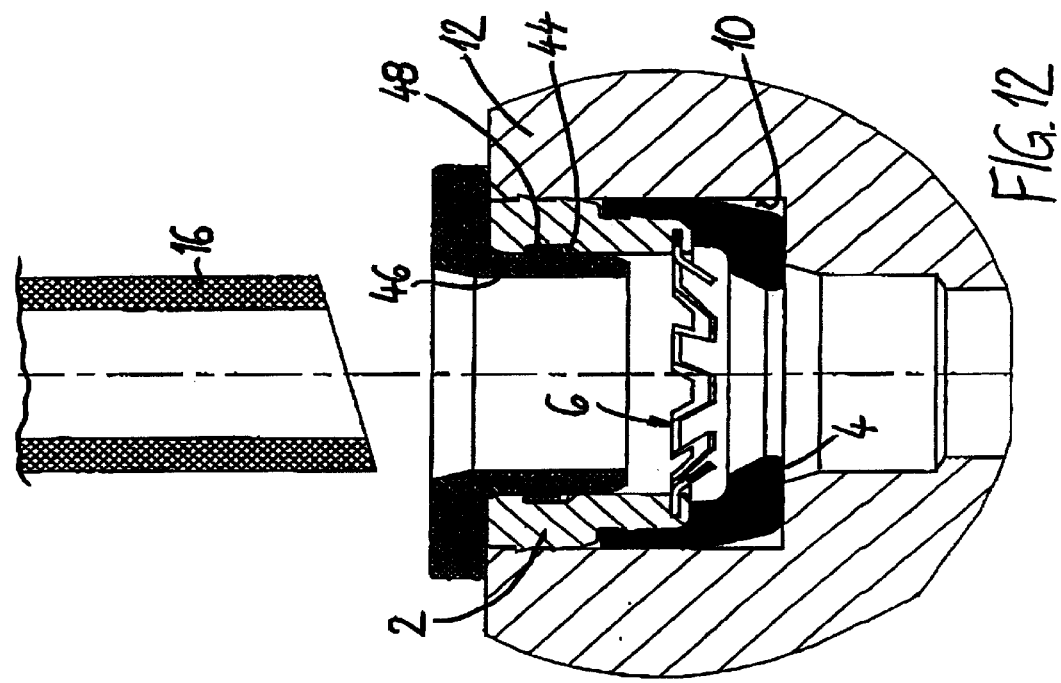

CONNECTING DEVICE FOR PIPES CONDUCTION PRESSURE MEDIUM

FIELD OF THE INVENTION

The present invention relates to a connecting device for pipes conducting pressure medium, having a sleeve-like insert part which can be inserted in a frictional and/or form-fitting manner into a connecting opening in a connecting body (for example, any desired assembly part or housing part) and surrounds a receiving opening for a pipe to be inserted, a sealing element for producing a seal between the connecting body and the pipe, a resilient, essentially annular holding element with holding arms which extend radially inward into the receiving opening, are distributed over the circumference and act in a barb-like manner against the outer circumference of the pipe, and in particular having a release sleeve which engages displaceably in the insert part in such a manner that by pushing in the release sleeve, the holding element can be deformed elastically for the purpose of releasing the pipe.

BACKGROUND OF THE INVENTION

A device of this type is disclosed in EP 0 616 161 B1. In this case, the holding element is designed as a toothed ring having a multiplicity of radial, tooth-like small holding arms which are connected to one another via peripheral connecting sections. The intention in this known design is to make provision for each peripheral connecting section to be deformable elastically in a narrow point formed within the insert part, with the result that each tooth itself is not deformed per se when the pipe is plugged in, but can pivot around each of the two adjacent peripheral connecting sections. This design consequently results in the toothed ring being mounted in a moveable manner, i.e. in a manner ensuring a conscientious clearance for movement, in its outer circumferential region. However, this mobility leads to the disadvantage that the pipe to be inserted has to be cut off at the end at relatively precisely right angles so that the toothed ring is deformed uniformly over the circumference when said pipe is plugged in. An obliquely cut off pipe could, on account of said clearance for movement, lead to the toothed ring tilting and therefore to problems when the pipe is plugged in.

EP 0 160 559 B1 also describes a similar pipe connection, in which a toothed or serrated ring is likewise mounted moveably just in its outer circumferential region too.

SUMMARY OF THE INVENTION

The invention is based on the object of providing a pipe-connecting device of the type mentioned, which ensures good and reliable securing of the pipe and improved insertion and operating characteristics when plugging the pipe in and also when releasing it, with the entire, fitted device and also its individual parts being of simple and inexpensive design.

According to the invention, this is achieved in that the holding element is held, by an outer circumferential region, in an essentially clearance-free manner axially, as seen in the direction of the plug-in axis of the pipe, relative to the insert part, with the result that elastic deformation takes place in the region of the holding arms when inserting or releasing the pipe.

According to the invention, the holding element is therefore held in a defined manner in particular in its outer circumferential region, specifically at least in the axial direction. There is no clearance in the axial direction or there is only a slight clearance to the effect that tilting of the entire holding element is thereby virtually ruled out in the outer circumferential region. The connecting device according to the invention is therefore advantageously also suitable for obliquely cut off pipe ends, because the holding arms can also be deformed independently of one another, i.e. also successively or in each case in a different manner, by the respective pipe end until said holding arms then all act equally against the outer circumference of the pipe. A readily definable holding function is then also achieved. In addition, a very thin and therefore cost-effective material (spring steel sheet) for the holding element can advantageously also be used on account of the securing in an essentially clearance-free manner axially.

The holding element can likewise be held in a clearance-free manner in the radial direction, i.e. transversely with respect to the insertion axis. However, a radial clearance for movement (sliding fit) may also be advantageous because self-centering of the holding element is thereby achieved when the pipe is plugged in.

BRIEF DESCRIPTION OF THE DRAWINGS

The invention will be explained in more detail with reference to preferred exemplary embodiments which are illustrated in the drawing, in which:

FIG. 1 shows a longitudinal section through a first embodiment of a connecting device according to the invention together with a pipe which has not yet been plugged in, FIG. 5 shows a plan view of the holding element in the arrow direction V according to FIG. 4, FIGS. 6 and 7 show a second embodiment of the connecting device again in longitudinal section before (FIG. 6) and after (FIG. 7) the pipe is plugged in, FIGS. 10 and 11 show a fourth embodiment in illustrations similar to FIGS. 6 and 7, FIGS. 12 and 13 show a further design variant again similar to FIGS. 6 and 7.

In the various figures of the drawings, parts which are identical are always provided with the same reference numbers and are therefore as a rule also only described once in each case.

DETAILED DESCRIPTION OF PREFERRED EMBODIMENTS

Figure 2:
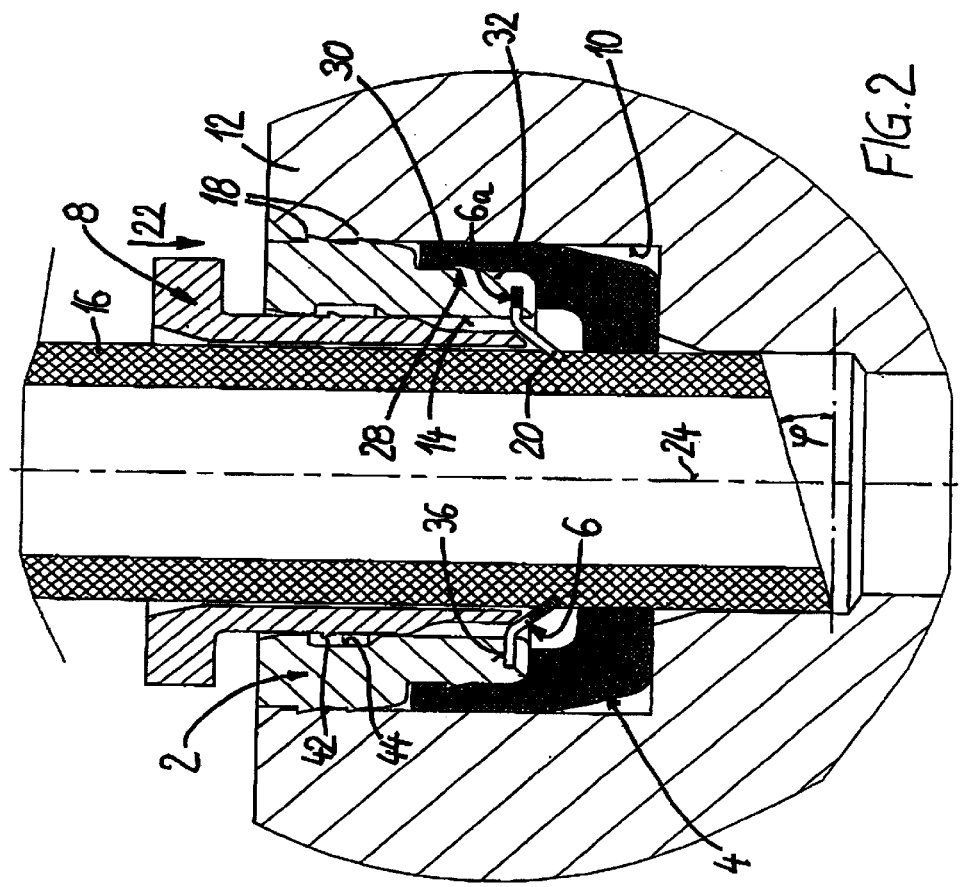
FIG. 2 shows an enlarged view similar to FIG. 1, but with the pipe inserted.
Figure 1:
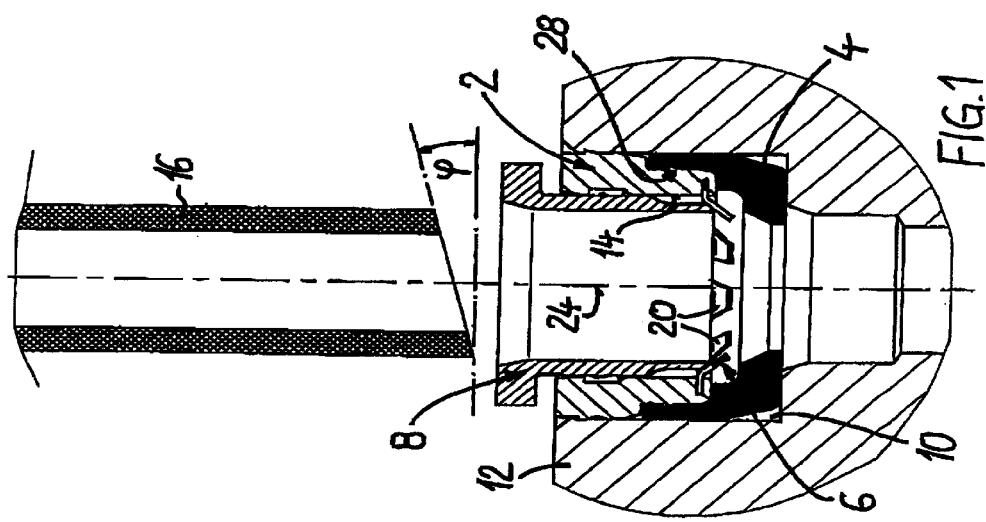
Figure 3:
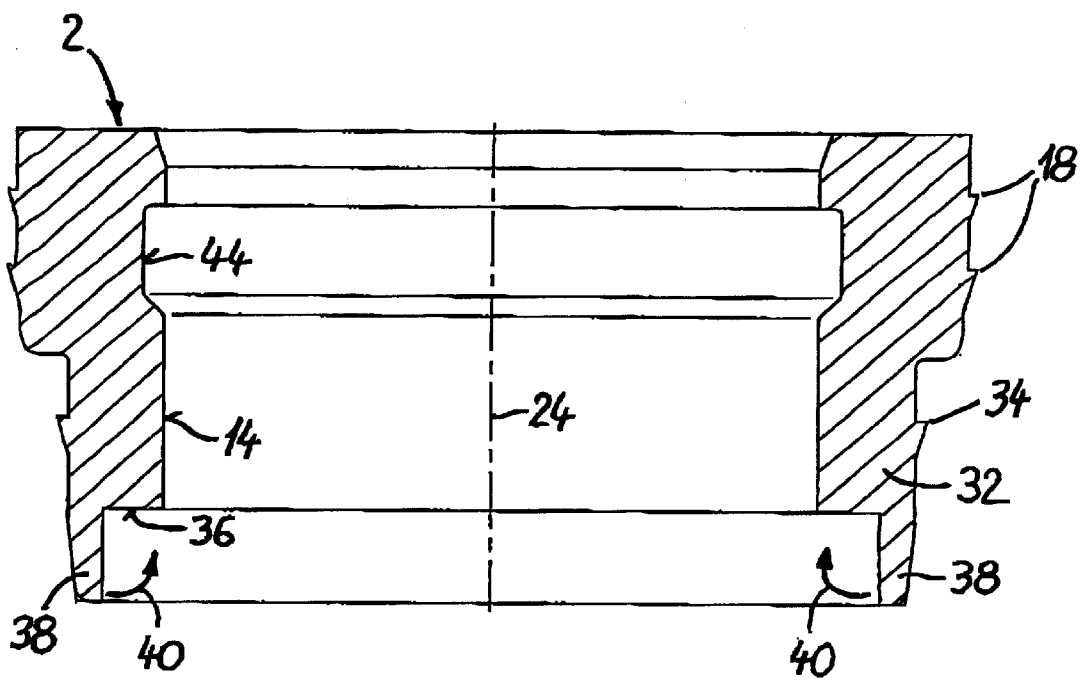
FIG. 3 shows an enlarged detail view of the insert part, likewise in longitudinal section, before it is inserted.

As emerges first of all from FIGS. 1 and 2, a connecting device according to the invention has a sleeve-like insert part 2, a sealing element 4, a holding element 6 and preferably a release sleeve 8. The insert part 2 forms, together with the other components, a press-in cartridge which can be inserted or pressed into a connecting opening 10 in any desired connecting body 12. The connecting body 12 can be formed by virtually any desired assembly part, for example a valve, or by a bushing-like housing part (shaped part) and consists preferably of an aluminum alloy or a fiber-reinforced plastic. The sleeve-like insert part 2 surrounds a receiving opening 14 for a pipe 16 to be inserted and has, on its outer circumference, tooth-like annual bumps 18 (see in particular FIGS. 2 and 3) for the frictional and/or form-fitting securing in the connecting opening 10 in the connecting body 12.

The sealing element 4 is used for producing a seal between the connecting body 12 and the pipe 16. In this case, the sealing element 4 also seals the pipe 16 against the insert part 2 at the inner circumference, on the one hand, and at the outer circumference, on the other hand, seals the insert part 2 against the connecting opening 10 of the connecting body 12. The holding element 6 is of resilient and essentially annular design and has holding arms 20 which protrude radially inward into the receiving opening 14, are distributed over the circumference and act in a barb-like manner against the outer circumference of the pipe 16. Reference is made in this respect in particular to the enlarged illustrations in FIGS. 4 and 5.

In this design, the release sleeve 8 is an integrated element and engages in an axially displaceable manner in an annular gap between the insert part 2 and the pipe 16 in such a manner that by pushing in the release sleeve 8 in the arrow direction 22, the holding element 6 can be deformed elastically for the purpose of releasing the pipe 16.

According to the invention, the holding element 6 is held, by an outer circumferential region 6a, in an essentially clearance-free manner axially, i.e. as seen in the direction of a plug-in axis 24 of the pipe 16, relative to the insert part 2. This has the consequence that elastic deformation takes place at least primarily in the region of the holding arms 20 when inserting or releasing the pipe 16. However, the holding element 6 is preferably held, by its outer circumferential region 6a, with a clearance for movement radially, i.e. as seen transversely with respect to the plug-in axis 24 of the pipe, in such a manner that an automatic centering of the holding element 6 with respect to the axis 24 is achieved when the pipe 16 is plugged in.

Figure 4:
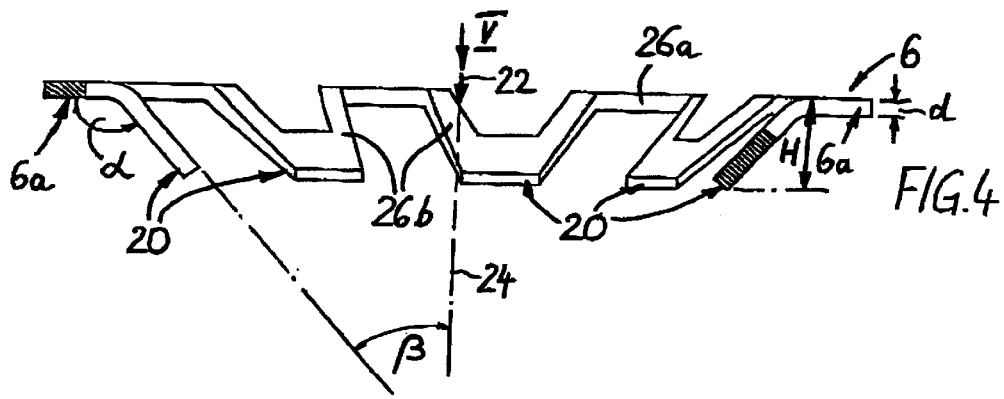
FIG. 4 shows an enlarged detail view of the holding element in a section similar to FIG. 1 (radial section IV—IV according to FIG. 5)
Figure 5:
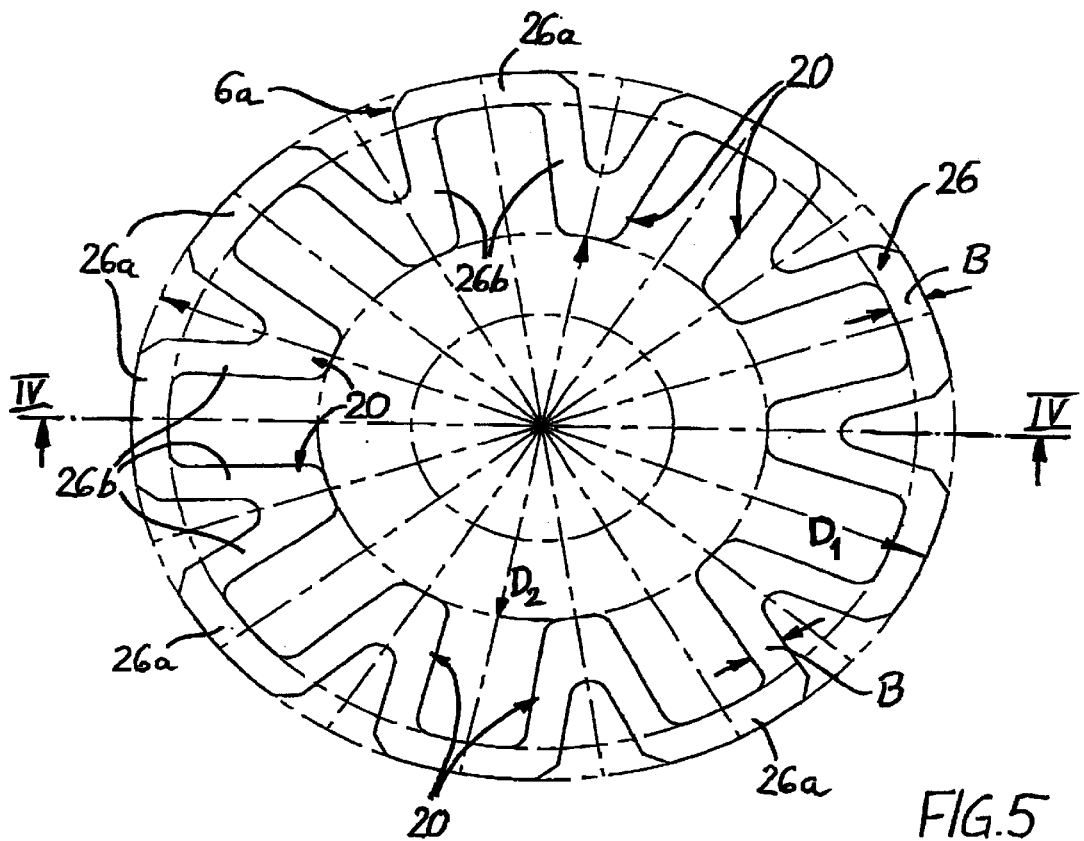

According to FIGS. 4 and 5, the holding element 6 is preferably designed as a punched bent part made of spring steel sheet. According to FIG. 4, the circumferential section 6a, which is held in a virtually clearance-free manner axially, lies in a radial plane extending perpendicularly with respect to the plug-in axis 24, while the holding arms 20 run obliquely radially inward and in the plug-in direction (cf. the arrow 22) of the pipe 16. The outer circumferential section 6a therefore merges into the holding arms 20 via an obtuse angle α of, in particular, approximately 130°. The holding arms 20 for their part consequently enclose with the plug-in axis 24 an acute angle β of, in particular, approximately 40°.

As furthermore emerges from FIG. 5, the holding element 6 in the preferred design consists of a sheet-metal strip 26 which runs in a zigzag manner in the circumferential direction and radially in such a manner that the circumferential section 6a, which is held in a clearance-free manner, comprises a plurality of circular arc sections 26a, and respectively adjacent circular arc sections 26a are connected via radial sections 26b which run in a V- or U-shaped manner and form the holding arms 20. A meandering serrated ring consequently results from this design.

It is furthermore preferably provided that the sealing element 4 is designed as a shaped ring (profiled ring) made of an elastic material and is fixed on the insert part 2 preferably via a frictional and/or form-fitting connection 28.

As illustrated, the sealing element 4 has for this purpose an outer annular collar 30 which is placed ("engaged") onto a cylindrical section 32 of the insert part 2. The frictional and/or form-fitting connection 28 is preferably formed by at least one circumferential, tooth-like bump 34 (FIG. 3) of the cylindrical section 32 of the insert part 2.

In the embodiments according to FIGS. 1 and 2, FIGS. 6 and 7 and FIGS. 12 and 13, it is provided that the outer circumferential region 6a of the holding element 6 is held in an inner, radial annular groove 36 of the insert part 2 (FIG. 2). This inner annular groove 36 is preferably formed by flanging an initially hollow-cylindrical end section 38 (FIG. 3) of the insert part 2, which consists of a flangeable material, in particular brass, by the end section 38 being flanged inward in the direction of the arrows 40 shown in FIG. 3, with the circumferential region 6a of the previously inserted holding element 6 being enclosed. In this case, a very small axial clearance can occur in the circumferential region 6a because of a slight springing-back—depending in each case on the deformation properties of the material in the flanging, but this clearance does not actually play any part in the deformation kinematics according to the invention of the holding element.

Figure 9:
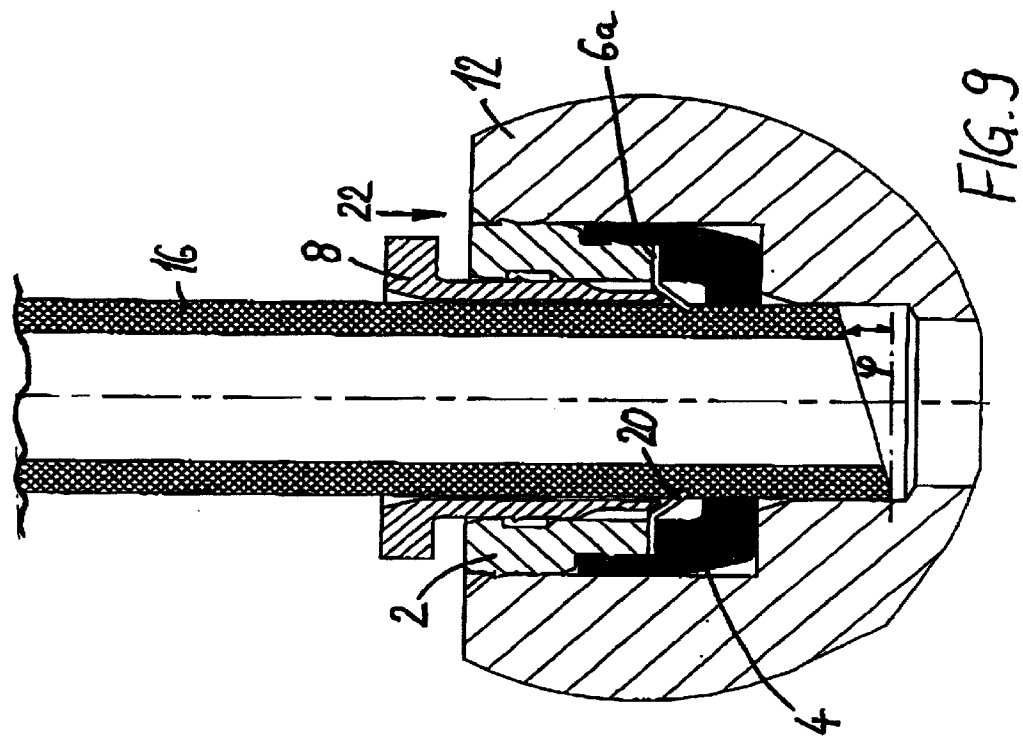
FIGS. 8 and 9 show illustrations similar to FIGS. 6 and 7 of a third embodiment of the connecting device according to the invention.
Figure 8:
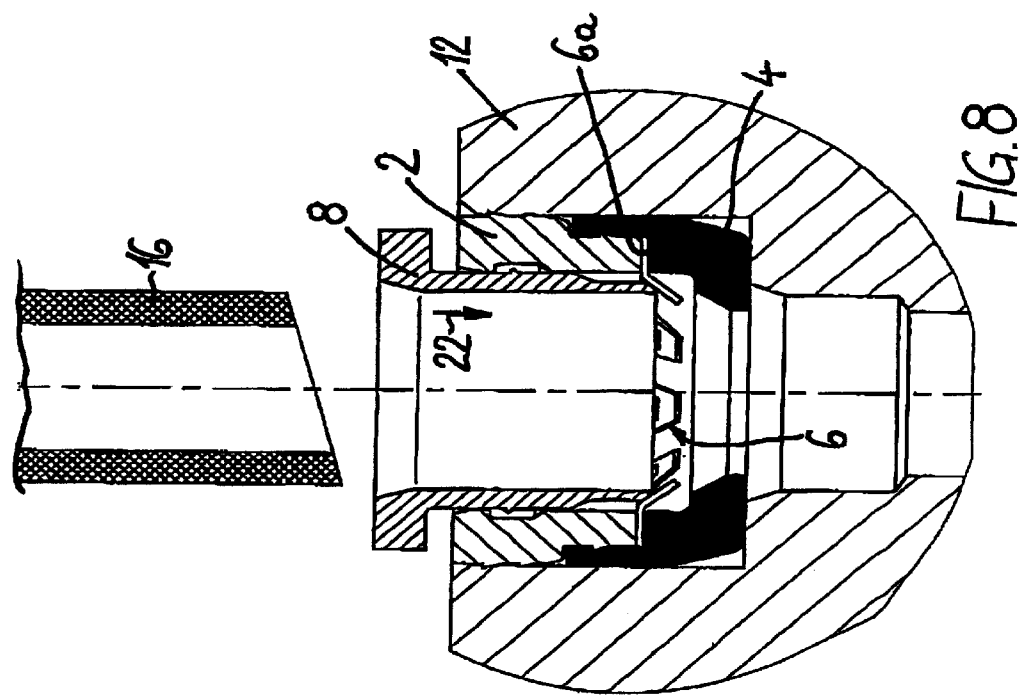
Figure 3:
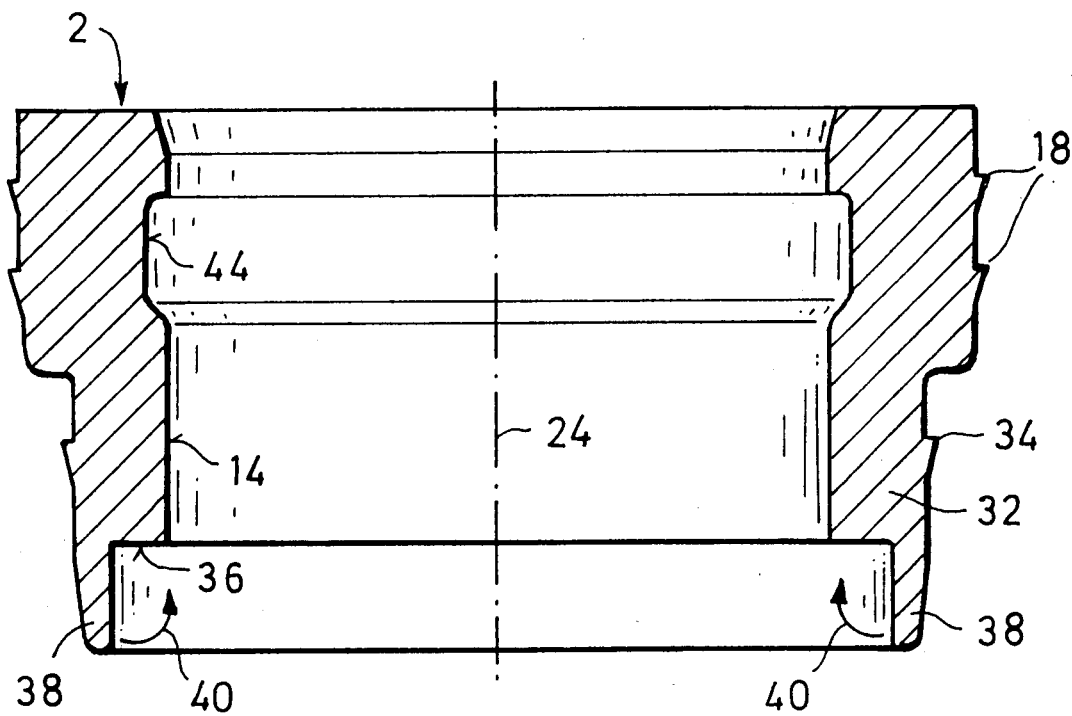
Figure 4:
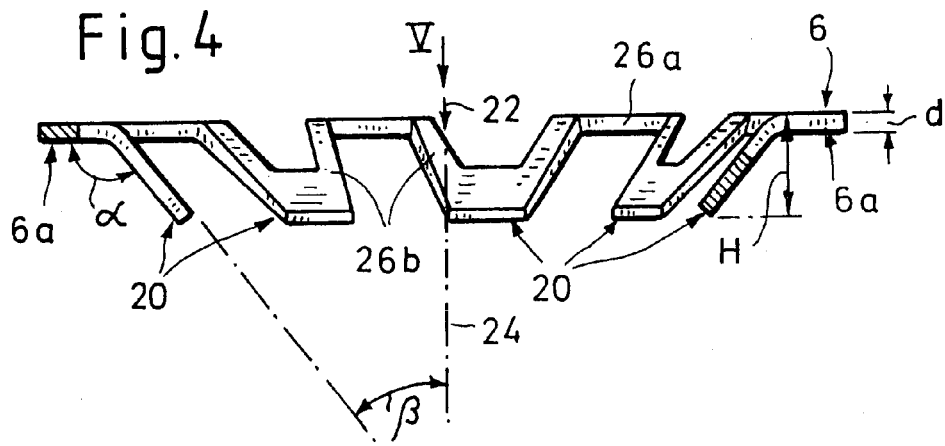
Figure 5:
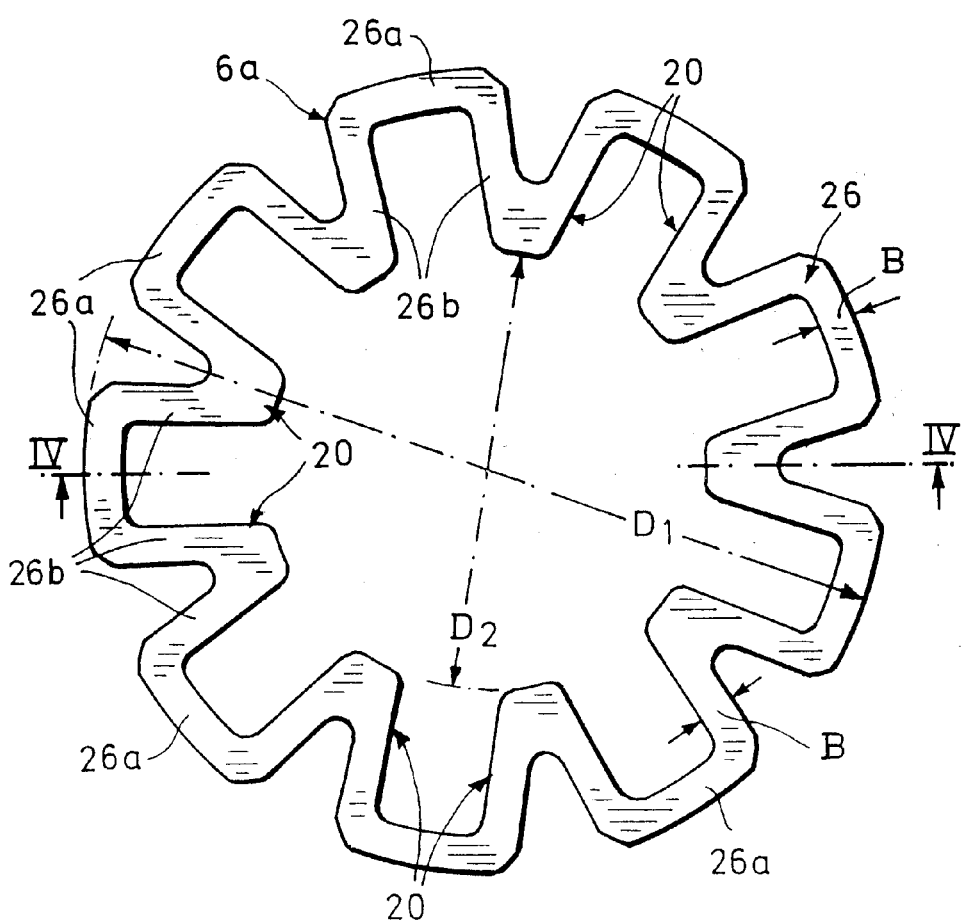
Figure 9:
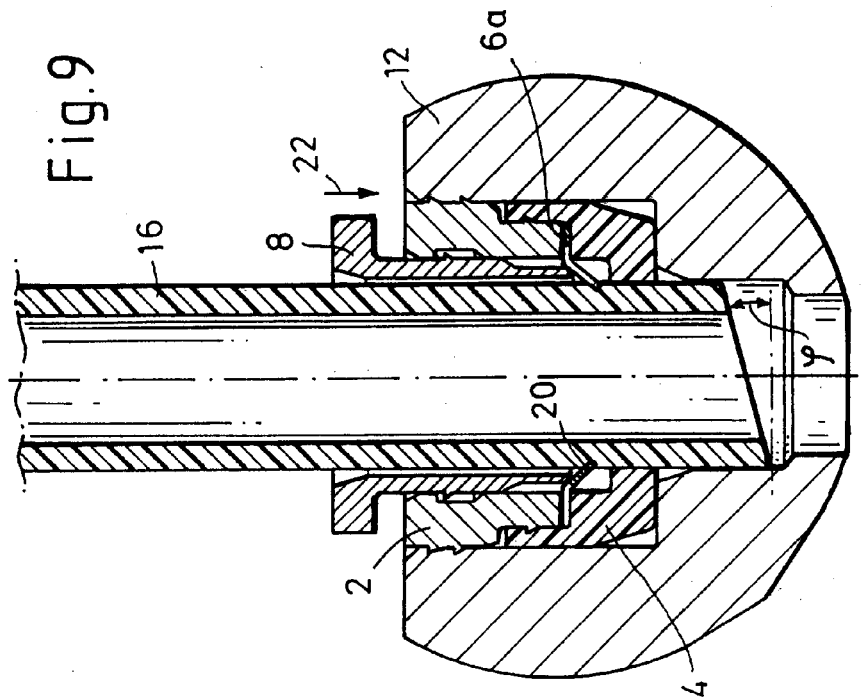
Figure 8:
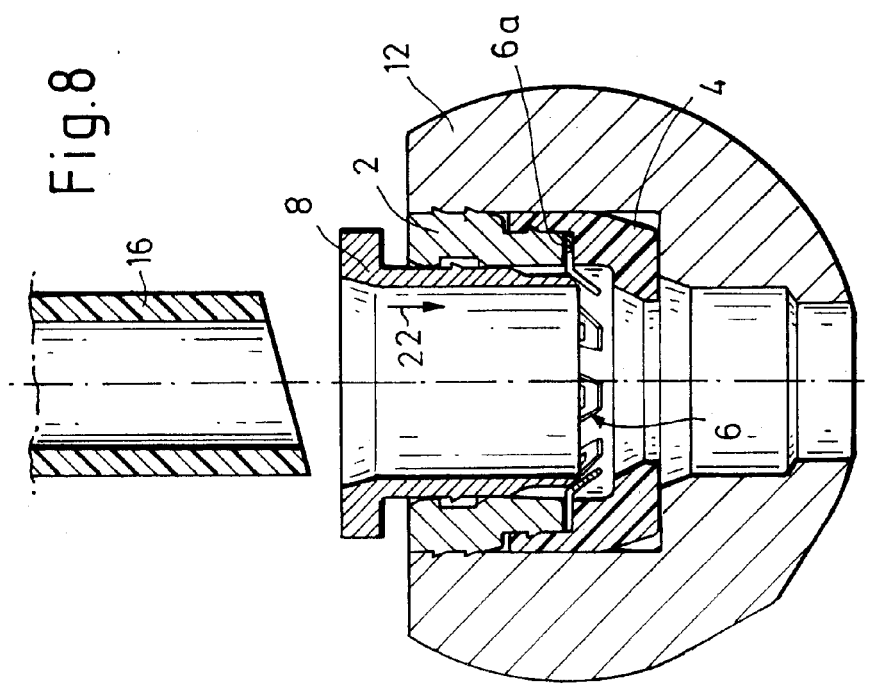

In the variant illustrated in FIGS. 8 and 9, the circumferential region 6a of the holding element 6 is held between the insert part 2 and the sealing element 4 by at least axial (end side) bearing. This results in a genuine freedom from clearance axially. In this case, the circumferential region 6a may also—unlike in the illustration—lie in an end-side depression of the insert part 2 and may be held therein by the sealing element simply bearing against it.

In the designs according to FIGS. 1, 2 and 6 to 11, the release sleeve 8 is advantageously connected to the remaining parts to form a constructional unit. For this purpose, the release sleeve 8 is preferably closed on its circumference, i.e. is not slit, and preferably latched into the insert part 2 in such a manner that although it can be displaced in the axial direction, it is secured against unintentional release or pulling out. As illustrated, for this purpose the release sleeve 8 engages, with an outer projection 42, in an inner release 44 of the insert part 2. All the individual parts 2, 4, 6 and 8 are thus connected to one another to form a constructional unit which, once pre-assembled, needs merely to be inserted or pressed into the connecting opening 10 in the assembly part 12. This constructional unit is particularly also suitable for automated pressing-in processes.

In the design illustrated in FIGS. 12 and 13, an integrated release sleeve is not provided, but nevertheless the pipe 16 can be released. For this purpose, a release sleeve (not illustrated) can be used as a tool. This release sleeve is then slit in an axially and radially continuous manner at one circumferential point and can thereby be expanded elastically in such a manner that it can be placed transversely onto the pipe 16 and can then be moved axially toward the holding element 6 in the arrow direction 22 (cf. FIG. 2) in a similar manner to the release sleeve 8. In this design without an integrated release sleeve, it is expedient to insert an elastomeric shaped part 46 into the annular gap between the insert part 2 and the pipe 16 so that protection against the ingress of dirt and the like is ensured. For fixing purposes, the shaped part 46 can engage with an outer projection 48 in a latching manner in the recess 44 (already mentioned) of the insert part 2.

According to FIGS. 6 and 7, an additional, cap-like covering 50 is also provided which, as a dirt seal, covers that region of the connecting body 12 which surrounds the pipe 16. The covering 50, which consists in particular of an elastomeric material, can be connected via, for example, dovetail-like connections, in a frictional and/or form-fitting manner to the release sleeve 8, the release movement of which (arrow 22) is then possible because of the elasticity of the covering 50.

In the design variant according to FIGS. 10 and 11, the holding element 6 engages, with outer, axially bent-over insertion sections 6b of the outer circumferential region 6a, in an axial annular groove 52 of the insert part 2. In this case, the holding element 6 is thereby also fixed in an essentially clearance-free manner in the radial direction.

Based on the described design according to the invention, it is advantageously also possible to plug in without any problem pipes 16 which are cut off obliquely on the end side at a certain angle Φ. This angle Φ can advantageously be up to at least 15°, but even up to 30° depending on the bore.

Preferred spheres of use for the connecting device according to the invention are, for example, compressed-air (secondary) load circuits in motor vehicles (passenger vehicles/trucks) having an operating pressure of up to 12 bar.

By virtue of its filigree design, the holding element 6 is very good value, a good holding function nevertheless being ensured by the fixing according to the invention of the outer circumferential section 6a in a manner which is clearance-free axially. For this purpose, the design described (shape and alignment) of the holding arms 20 is also advantageous.

In a design which is realized in concrete terms and is designed for pipes having an external diameter of approximately 4 mm (for example, polyamide pipe 4×1), the holding element 6, has, for example, the following dimensions (cf. for this purpose FIGS. 4 and 5):

external diameter D1: approximately 6.8 mm internal diameter D2 in the inner end region of the holding arms 20: approximately 2.9 mm thickness d of the spring steel sheet: approximately 0.2 mm width B of the sheet-metal strip 26: approximately 0.4 mm number of holding arms 20: for example 9, angular spacing of 40° resulting therefrom overall height H (axially): approximately 1.1 mm.

In this case, the stiffness of the holding arms 20—and therefore also the holding force achieved overall—is determined primarily by the width B in the region of the holding arms and of the radial sections 26b of the sheet metal strip material.

The invention is, however, not restricted to the exemplary embodiments shown and described, but also includes all the embodiments having the same effect within the scope of the invention. Furthermore, the invention so far is also not yet restricted to the combination of features defined in claim 1, but may also be defined by any other desired combination of certain features of all of the individual features disclosed in their entirety. This means that, in principle, virtually any individual feature of claim 1 may be omitted or replaced by at least one individual feature disclosed elsewhere in the application. In this respect, claim 1 is to be understood merely as a first attempt at defining the invention.

What is claimed is:

1. A connecting device having a receiving opening (14) for a pipe (16) conducting a pressure medium, the connecting device comprising:

a sleeve-like insert part (2) operative to be inserted in a frictional or form- fitting manner into a connecting opening (10) of a connecting body (12) so as to surround the receiving opening (14) for a pipe (16) to be inserted;

a sealing element (4) operative to be inserted into the connecting opening (10) for producing a seal between the connecting body (12) and the pipe (16);

a resilient and substantially annular holding element (6) with holding arms (20) which extend radially inward into the receiving opening (14);

the holding arms being distributed over a circumference of the sealing element and acting in a barb-like manner against the outer circumference of the pipe (16);

the holding element (6) comprising an outer circumferential region (6a) held in an inner radial annular groove (36) of the insert part (2);

the inner annular groove (36) being formed at an initially hollow-cylindrical end section (38) of the insert part (2) flanged to receive the outer circumferential region (6a) of the element (6) in such a way that the outer circumferential region (6a) of the holding element (6) is held in a substantially clearance-free manner without play axially, as seen in the direction of a plug-in axis (24) of the pipe (16), relative to the insert part (2), so that elastic deformation of the holding element takes place mainly in the region of the holding arms (20) when inserting or releasing the pipe (16), and so that the holding element (6) is held by the outer circumferential region (6a) in a displaceable manner radially, transversely with respect to the plug-in axis (24) of the pipe, whereby self-centering of the pipe is achieved during the process of inserting the pipe into the receiving opening.

2. The connecting device as claimed in claim 1, which comprises a release sleeve (8) which engages displaceably in the insert part (2) in such a manner that pushing in the release sleeve (8), the holding element (6) can be deformed elastically for the purpose of releasing the pipe (16).

3. The connecting device as claimed in claim 2, wherein the release sleeve (8) is latched as an integral device component into the insert part (2).

4. The connecting device as claimed in claim 2, which comprises a protective cap (50) which covers the insertion region of the connecting body (12) as a dirt seal and is held on the release sleeve (8).

5. The connecting device as claimed is claim 2, wherein the release sleeve can be fitted and removed as a separate tool, the release sleeve being slit in a radially and axially continuous manner at one circumferential point and thereby being expandable.

6. The connecting device as claimed in claim 5, which comprises an elastic shaped part (46) which is in the form of a sleeve and, when the release sleeve is removed, engages as a dirt seal in the annular gap between the pipe (16) and the insert part (2).

7. The connecting device as claimed in claim 1, wherein the holding element (6) is also held, by the outer circumferential region (6a), in a clearance-free manner radially, transversely with respect to the plug-in axis (24) of the pipe.

8. The connecting device as claimed in claim 1 wherein the holding element (6) is designed as a punch bent part made of spring steel sheet.

9. The connecting device as claimed in claim 1, wherein the circumferential section (6a) of the holding element (6), which section is held in a clearance-free manner axially, lies in a radial plane extending perpendicularly with respect to the plug-in axis (24).

10. The connecting device as claimed in claim 1, wherein the radially inwardly extending holding arms (20) run obliquely in the plug-in direction (22) of the pipe (16).

11. The connecting device as claimed in claim 1, wherein the holding element (6) consists of a sheet-metal strip (26) which runs in a zigzag manner in the circumferential direction and radially in such a manner that the circumferential section (6a), which is held in a clearance-free manner axially, comprises a plurality of circular arc sections (26a), and respectively adjacent circular arc sections (26a), and respectively adjacent circular arc sections (26a) are connected via radial sections (26b) which run in a V- or U-shaped manner and form the holding arms (20).

12. The connecting device as claimed in claim 1, wherein the sealing element (4) is designed as a shaped ring made of an elastic material and is fixed on the insert part (2) preferably via a frictional or form-fitting connection (28).

13. The connecting device as claimed in claim 1, wherein the circumferential region (6a) of the holding element (6) is held between the insert part (2) and the sealing element (4).

14. The connecting device as claimed in claim 1, wherein the circumferential region (6a) of the holding element (6) is held, by axially bent-over insertion sections (6b), in an axial groove (52) of the insert part (2).

* * * * *

UNITED STATES PATENT AND TRADEMARK OFFICE
CERTIFICATE OF CORRECTION

PATENT NO. : 6,612,623 B2
DATED : September 2, 2003
INVENTOR(S) : Bernd Salomon-Bahls It is certified that error appears in the above-identified patent and that said Letters Patent is hereby corrected as shown below:

Drawings,
Substitute new Figs. 1-13 for the corresponding original figures.

Column 6,
Line 43, "is" should read -- in --;
Line 44, insert -- release -- following "separate".

Signed and Sealed this

Twenty-seventh Day of July, 2004

JON W. DUDAS
*Acting Director of the United States Patent and Trademark Office*

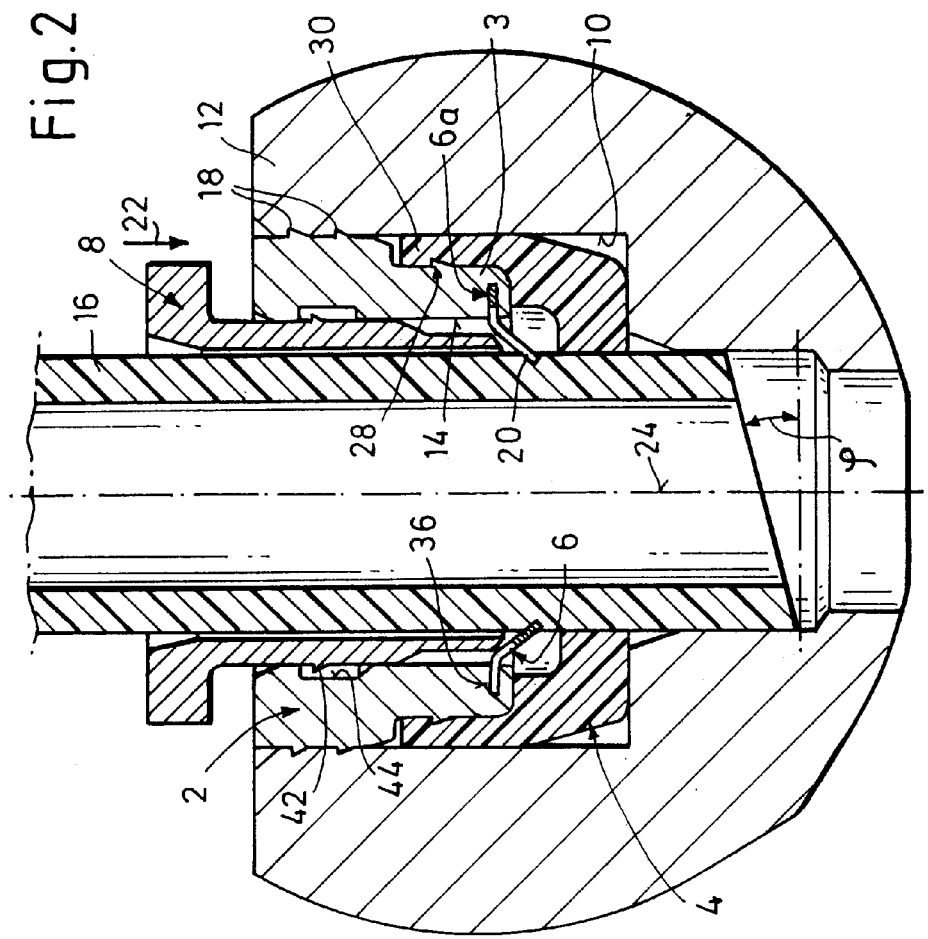
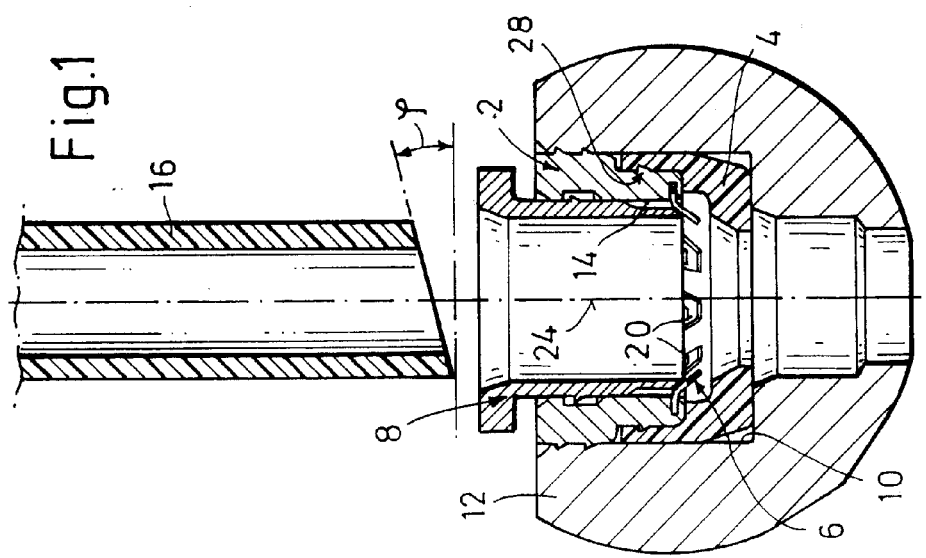

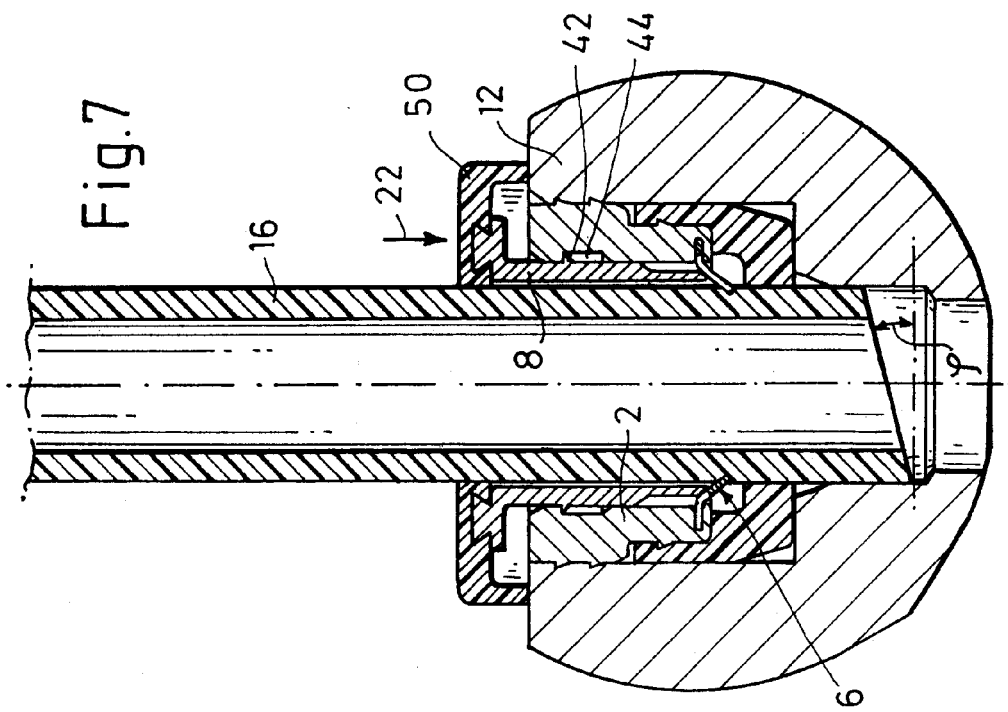
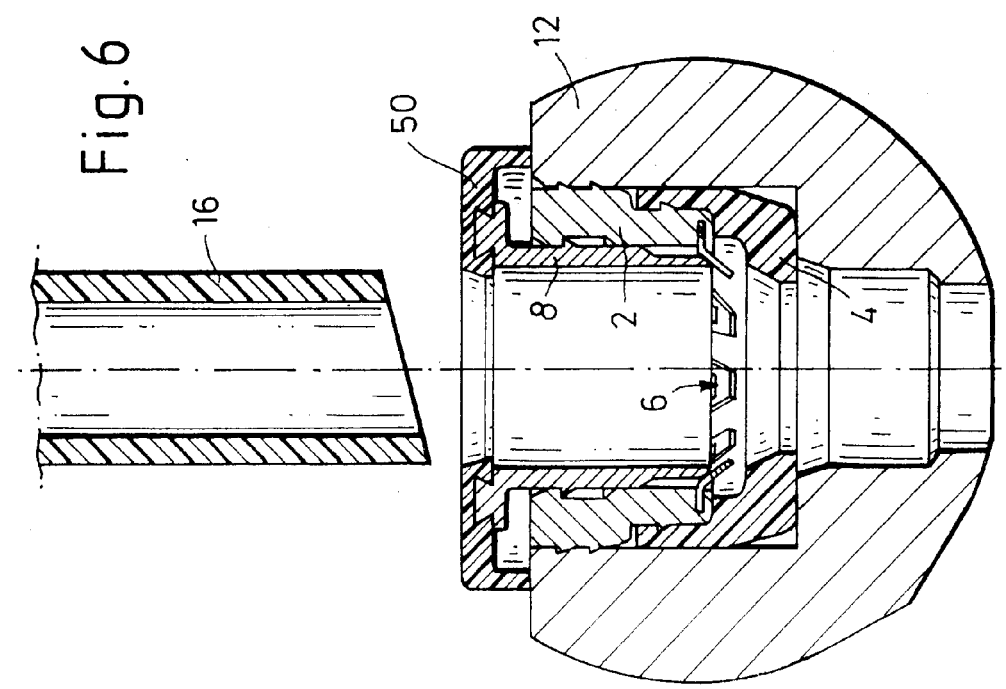

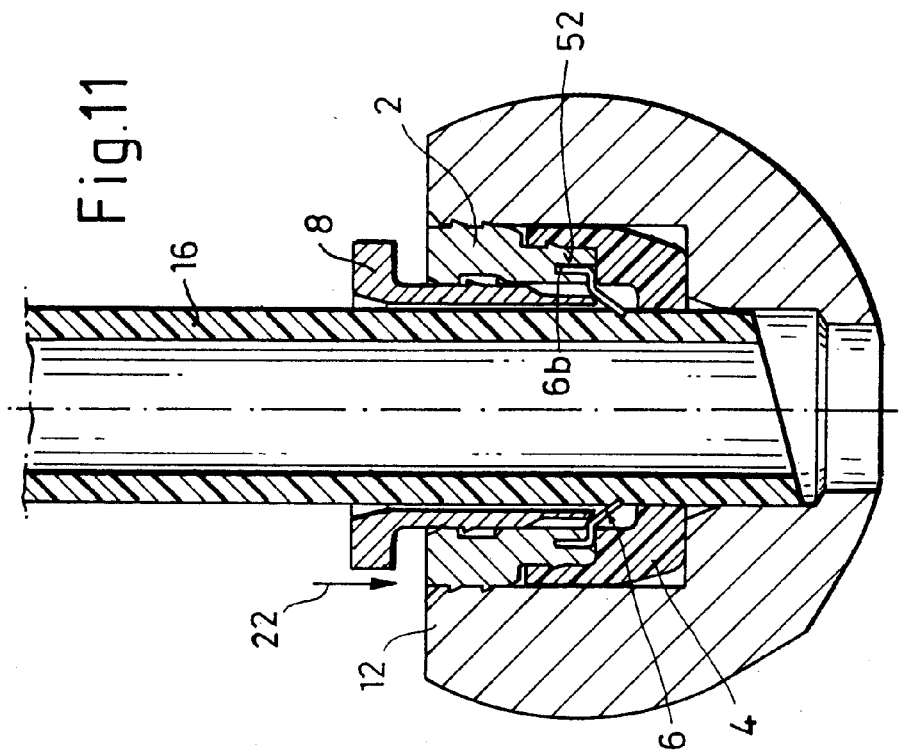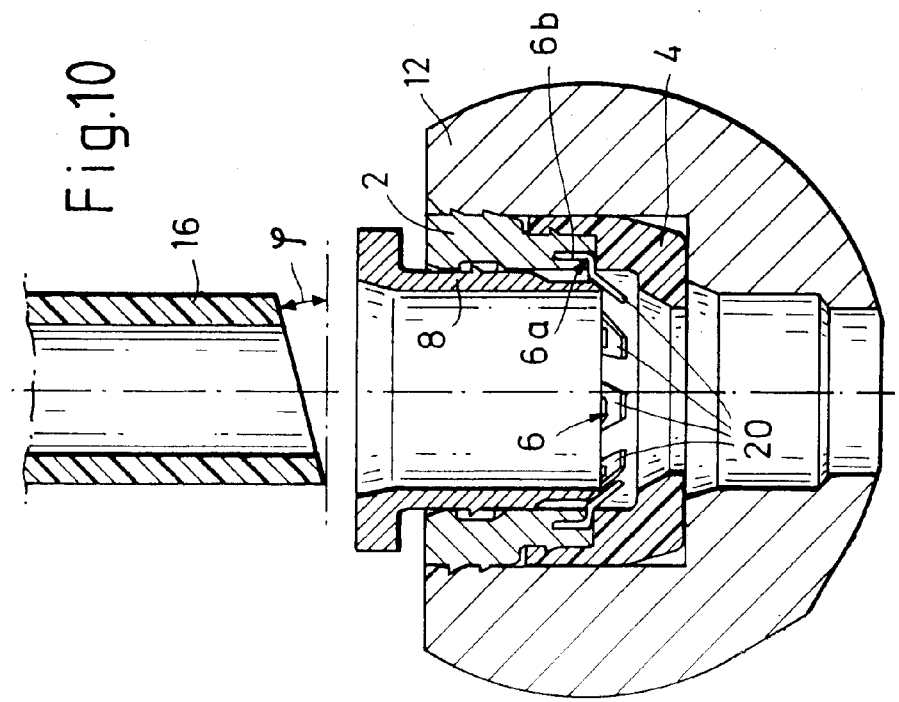

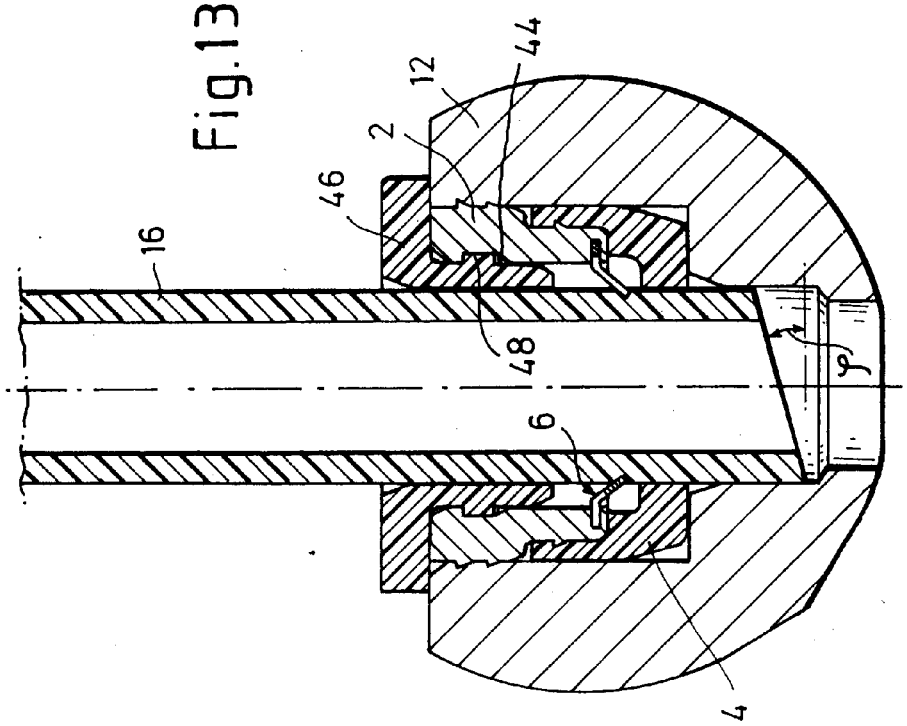
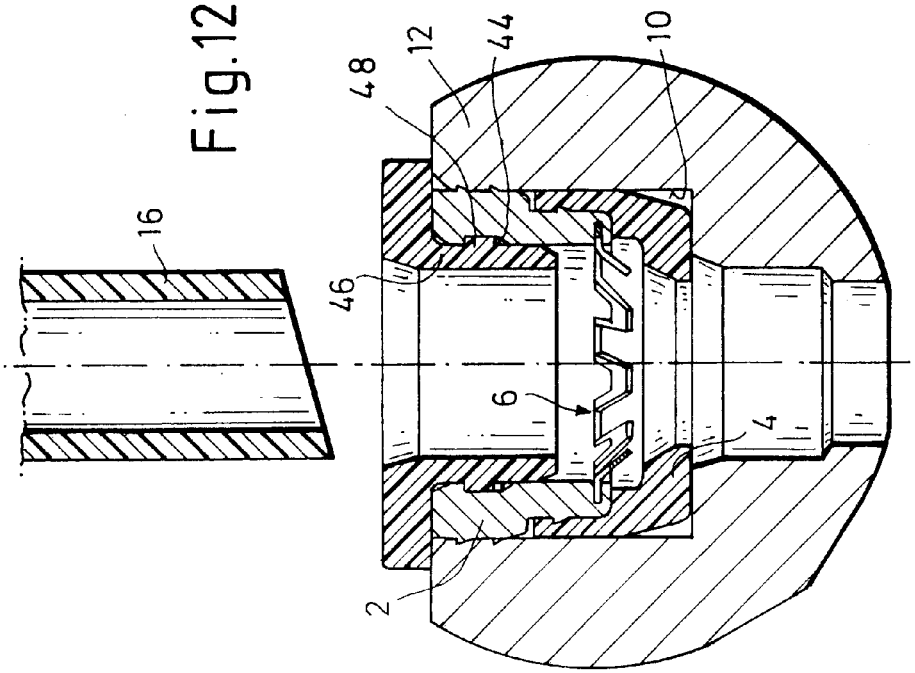

UNITED STATES PATENT AND TRADEMARK OFFICE
CERTIFICATE OF CORRECTION

PATENT NO. : 6,612,623 B2 Page 1 of 1
APPLICATION NO. : 09/982517
DATED : September 2, 2003
INVENTOR(S) : Bernd Salomon-Bahls It is certified that error appears in the above-identified patent and that said Letters Patent is hereby corrected as shown below:

On the Title Page (30)
Please add Foreign Application Priority Data as follows:

Oct. 19, 2000 (DE)             200 17 921.7

Signed and Sealed this

Fourth Day of September, 2007

JON W. DUDAS
*Director of the United States Patent and Trademark Office*